United States Patent [19]

Davidson

[11] 3,991,843
[45] Nov. 16, 1976

[54] CYCLES

[75] Inventor: Charles Patrick Duncan Davidson, Droitwich, England

[73] Assignee: The Lucas Electrical Company Limited, Birmingham, England

[22] Filed: June 20, 1975

[21] Appl. No.: 588,782

[30] Foreign Application Priority Data

June 28, 1974 United Kingdom............ 28776/74
Aug. 10, 1974 United Kingdom............ 35350/74

[52] U.S. Cl. ............................ 180/33 C; 180/34; 280/214
[51] Int. Cl.² ........................................ B62M 7/00
[58] Field of Search ............. 180/33 C, 33 D, 34, 180/65 A; 280/212, 214, 215

[56] References Cited
UNITED STATES PATENTS

| | | | |
|---|---|---|---|
| 552,312 | 12/1895 | Battey | 180/33 C |
| 3,513,928 | 5/1970 | Emmons | 180/65 A |
| 3,598,195 | 8/1971 | Steller | 180/34 X |
| 3,773,131 | 11/1973 | Jaulmes | 180/33 C X |

FOREIGN PATENTS OR APPLICATIONS

| | | |
|---|---|---|
| 870,657 | 3/1942 | France ............. 180/33 C |
| 2,180,709 | 3/1973 | France |
| 2,082,868 | 3/1970 | France |
| 867,657 | 11/1941 | France |
| 977,503 | 4/1951 | France |
| 443,948 | 2/1968 | Switzerland |
| 241,133 | 6/1946 | Switzerland |

*Primary Examiner*—Philip Goodman
*Assistant Examiner*—John P. Silverstrim
*Attorney, Agent, or Firm*—Holman & Stern

[57] ABSTRACT

A cycle according to the invention includes a rotatable pedal wheel coupled by a chain to the driving wheel of the cycle. An electric motor and associated power source are carried by the frame of the cycle and are coupled to the rear wheel whereby the electric motor can propel. An electrical switch is operable by tension in the chain resulting from pedalling action by the rider and the switch must be operated in order for the motor to be energized.

7 Claims, 2 Drawing Figures

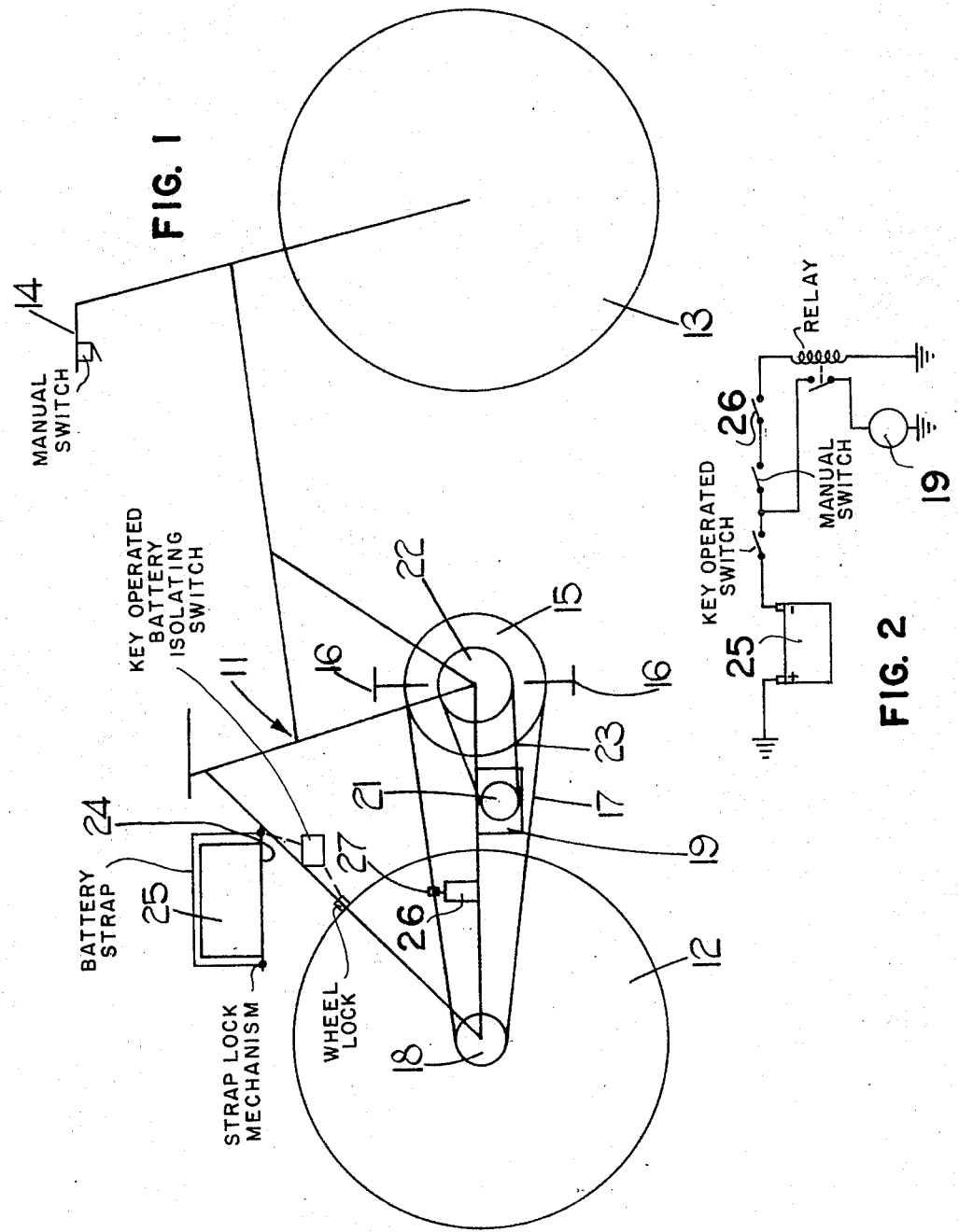

CYCLES

FIELD OF THE INVENTION

This invention relates to cycles, particularly but not exclusively bicycles.

SUMMARY AND OBJECTS OF INVENTION

A cycle according to the invention includes a frame, a ground engaging wheel rotatably mounted on the frame, a rotatable drive member rotatably mounted on the frame and arranged to be rotated by the rider of the cycle, an endless, non-extensible, flexible member coupling said wheel and said drive member whereby rotation of said drive member rotates said wheel to propel the cycle, an electric motor and an associated power source carried by said frame, means transmitting rotational movement of the output of the motor to said drive member whereby said motor can propel the cycle, and electrical switch means in use controlling energisation of said motor, said electrical switch means being operable by said endless member when said endless member is subject to tension as a result of rotation of said drive member in a direction to propel the cycle.

Preferably a manually operable electrical switch is connected in series with said switch means, operation of both said switch and said switch means being required to energise said motor.

Conveniently said drive member is a toothed wheel having connected thereto pedals whereby the toothed wheel can be rotated by said rider, and said endless member is a chain.

Preferably there is provided a free-wheel mechanism associated with said means transmitting rotational movement of the output of the motor to said drive member, said free-wheel mechanism being so arranged that the output of the motor can drive said drive member in a direction to propel the cycle, but said mechanism slips to prevent said drive member driving said motor when said drive member is being rotated to propel the cycle.

DESCRIPTION OF THE FIGURES OF THE DRAWING

FIG. 1 is a diagrammatic representation of a bicycle in accordance with one example of the invention.

FIG. 2 is a wiring diagram utilized in FIG. 1.

DESCRIPTION OF A PREFERRED EMBODIMENT

Referring to the drawings, the bicycle includes a frame 11 constructed from metal tube in the usual manner. Rotatably mounted on the frame 11 are first and second ground engaging wheels 12, 13 the wheel 13 being steerable by way of handle bars 14 and the wheel 12 being a driving wheel. Also rotatably mounted on the frame 11 is a toothed chain wheel 15 having connected thereto pedals 16 whereby the chain wheel 15 can be rotated by a rider of the vehicle. An endless, non-extensible, flexible chain 17 couples the toothed chain wheel 15 and a toothed pinion 18 incorporating, if desired, a conventional free-wheel mechanism, carried by the wheel 12. The arrangement is such that rotation of the chain wheel 15 is transmitted by the chain 17 to the wheel 12 to propel the cycle.

Secured to the frame 11 is an electric motor 19 having a rotatable output member 21. The output member 21 is connected to a drive pulley 22 by a drive belt 23, the pulley 22 being secured to and coaxial with the chain wheel 15. A carrier 24 secured to the frame 11 supports an electric storage battery 25 and upon completion of an electrical circuit between the battery 25 and the motor 19 the output of the motor 19 is caused to rotate, driving the chain wheel 15 by way of the belt 23, and thus propelling the cycle.

Secured to the frame 11 intermediate the chain wheel 15 and the driving wheel 12 is an electrical switch 26 having an operating member 27 engaging the chain 17. A further electrical switch (not shown) is also carried by the frame, and is operable manually by rotation of a twist grip on handle bars 14.

The electrical circuit (illustrated in FIG. 2) of the drive arrangement of the cycle is as follows:

One pole of the battery 25 is electrically connected to one terminal of the motor 19 by way of said further, manually operable switch, and the normally open contacts of a relay. The other terminal of the motor 19 is connected to the other pole of the battery 25, and connected in series are the operating winding of the normally open relay, and the contacts of the switch 26 which is also a normally open switch. The series connected winding and switch 26 is in parallel with the series connected relay contacts and motor 19.

Closure of said manually operable switch by operation of the twist grip will not result in energisation of the motor unless the contacts of the normally open switch 26 are closed. In the event that the contacts of the switch 26 are closed then current flows in the relay winding, thus energising the relay and closing the normally open contacts thereof so as to complete the electrical circuit to the motor. The switch 26 is operated by the chain 27, the contacts of the switch 26 being closed by subjecting the upper run of the chain 17 to tension. Clearly, the upper run of the chain can be subject to tension by the rider applying force to the pedals 16 to propel the cycle. Assuming that the twist grip controlled switch is closed then immediately the rider attempts to propel the vehicle the switch 26 will be closed and the motor 19 energised. Thereafter, even if the rider ceases to apply force to the pedals 16 tension in the upper run of the chain 17 will be maintained since the motor 19 drives the chain wheel 15.

However, it is found in practice that the motor 19 will not reliably maintain sufficient tension to keep the switch 26 closed and the slightest jolt, for example when travelling on an uneven surface, will cause the switch to open so breaking the motor circuit and preventing the cycle being propelled solely by the power of the motor. In order to close the switch 26 again it is necessary for the rider to apply driving force by the pedals.

Should the rider require de-energisation of the motor 19 then he has the choice of releasing the twist grip operated switch so breaking the circuit of the relay and permitting the relay contacts to open de-energising the motor 19, or alternatively the rider can apply force to the pedals 16 to oppose the motor 19 thereby releasing the tension in the upper run of the chain 17 permitting the switch 26 to return to its normally open condition de-energising the relay winding and so breaking the circuit to the motor 19. As mentioned above, merely ceasing to pedal will rapidly result in opening of the switch 26 even without physically opposing the motor.

In modification of the arrangement the relay is a normally closed relay, and the switch 26 is a normally closed switch tension in the upper run of the chain 17 serving to open the switch. Thus assuming that the twist grip operated switch is closed then in the absence of tension in the upper run of the chain 17 the normally closed switch 27 will be closed energising the normally closed relay and so maintaining the contacts of the relay in an open condition so that the motor is not energised. However, application of tension to the upper run of the chain 17 will open the normally closed switch thereby de-energising the relay and permitting the normally closed contacts to return to their closed position so energising the motor 19.

In a modification of either of the arrangements described above the drive pulley 22 and drive belt 23 are replaced by a second chain wheel and a second flexible, non-extensible chain, the output member 21 of the motor driving the second chain wheel by way of the second chain. The second chain wheel is secured to and coaxial with the chain wheel 15. In order that the cycle can be ridden without undue resistance, when the motor 19 is not energised, the output member 21 of the motor incorporates a free-wheel mechanism of conventional type. The rotatable output member 21 is in fact a pinion gearwheel similar to the pinion gearwheel 18 and incorporates a conventional free-wheel mechanism so arranged that when the output shaft of the motor rotates in a direction to drive the chain wheel 15 so that the cycle is propelled forwardly, then the free-wheel mechanism locks to transmit such drive. However, in the event that the chain wheel 15 overruns the motor output in the same direction of rotation, the free-wheel mechanism slips so that the drive is not transmitted from the second chain wheel to the motor output shaft. It follows therefore that in the event that the motor is not energised then any attempt to propel the cycle forwardly by means of the pedals 16 will cause the first and second chain wheels to overrun the motor output, and the free-wheel mechanism will slip so that the motor is not drivien. Thus when the bicycle is being pedalled in the conventional manner the resistance to rotation of the motor does not add to the resistance to pedalling.

The electrical circuit of the drive arrangement is as described above, with the exception that the circuit incorporates a key-operated battery isolating switch whereby the battery can be dis-connected from the circuit. Thus since the battery isolating switch is key-operated then possession of the correct key becomes a requirement for lawful operation of the cycle, the appropriate key being required before the battery can be connected in circuit with the other control switches. The use of a key-operated battery isolating switch of course only procludes and unlawful user making use of the power assistance provided to the pedalling action by the motor. However, in an alternative the key-operated switch is associated with a mechanical lock which when operated prevents rotation of the rear wheel 12 relative to the frame of the cycle, the mechanical arrangement being released to permit rotation of the wheel by operation of the key in the key-operated switch. Additionally, the mechanical locking mechanism can incorporate means whereby battery retaining straps which hold the battery 25 on the carrier 24 are locked in position when the wheel 12 is locked and the battery is isolated.

It will be understood that in the arrangements described above ant conventional form of gear change mechanism can be incorporated into the pinion 18, for example the pinion 18 can be part of a three, or four speed hub gear, or can be part of a Derailleur gear arrangement, either form of gear arrangement of course being under the manual control of the rider.

I claim:

1. A cycle including a frame, a ground engaging wheel rotatably mounted on the frame, a rotatable drive member rotatably mounted on the frame and arranged to be rotated by the rider of the cycle, an endless, non-extensible, flexible member coupling said wheel and said drive member whereby rotation of said drive member rotates said wheel to propel the cycle, an electric motor and an associated power source carried by said frame, means transmitting rotational movement of the output of the motor to said drive member whereby said motor can propel the cycle, and electrical switch means in use controlling energisation of said motor, said electrical switch means being operable by said endless member when said endless member is subject to tension as a result of rotation of said drive member in a direction to propel the cycle.

2. A cycle as claimed in claim 1 wherein a manually operable electrical switch is connected in series with said switch means, operation of both said switch and said switch means being required to energise said motor.

3. A cycle as claimed in claim 1 wherein said drive-member is a toothed wheel having connected thereto pedals whereby the toothed wheel can be rotated by said rider, and said endless member is a chain.

4. A cycle as claimed in claim 1 wherein there is provided a free-wheel mechanism associated with said means transmitting rotational movement of the output of the motor to said drive member, said free-wheel mechanism being so arranged that the output of the motor can drive said drive member in a direction to propel the cycle, but said mechanism slips to prevent said drive member driving said motor when said drive member is being rotated to propel the cycle.

5. A cycle as claimed in claim 1 wherein there is provided a key-operated battery isolating switch whereby the battery can be disconnected from the remainder of the electrical circuit of the cycle.

6. A cycle as claimed in claim 5 wherein said key-operated battery isolating switch has associated therewith a mechanical lock for preventing rotation of said ground engaging wheel, said mechanical lock being released to permit rotation of the wheel by operation of the key in the key-operated switch.

7. A cycle as claimed in claim 6 wherein said power source carried by the frame is a battery and has associated therewith retaining straps securing the battery to the frame, said retaining straps being locked in position by a mechanism operable with said mechanical lock of the ground engaging wheel.

* * * * *